United States Patent
Zhang et al.

(10) Patent No.: US 9,444,094 B2
(45) Date of Patent: Sep. 13, 2016

(54) PREPARATION OF HIGH ENERGY-DENSITY ELECTRODE MATERIALS FOR RECHARGEABLE MAGNESIUM BATTERIES

(71) Applicant: Toyota Motor Engineering & Manufacturing North America, Inc., Erlanger, KY (US)

(72) Inventors: Ruigang Zhang, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 304 days.

(21) Appl. No.: 13/870,765

(22) Filed: Apr. 25, 2013

(65) Prior Publication Data

US 2014/0322595 A1    Oct. 30, 2014

(51) Int. Cl.
 *H01M 4/134*     (2010.01)
 *H01M 10/054*    (2010.01)
 *H01M 4/62*      (2006.01)
 *H01M 4/46*      (2006.01)

(52) U.S. Cl.
 CPC ............. *H01M 4/134* (2013.01); *H01M 4/466* (2013.01); *H01M 4/625* (2013.01); *H01M 10/054* (2013.01); *Y02E 60/122* (2013.01)

(58) Field of Classification Search
 CPC .............................. H01M 4/134; H01M 4/466
 USPC ........................................................ 429/188
 See application file for complete search history.

(56) References Cited

U.S. PATENT DOCUMENTS

| 4,718,475 | A | 1/1988 | Das et al. |
|---|---|---|---|
| 6,265,109 | B1 * | 7/2001 | Yamamoto et al. ........ 429/231.6 |
| 6,881,518 | B2 | 4/2005 | Kaminaka et al. |
| 7,425,285 | B2 | 9/2008 | Asao et al. |
| 2008/0220330 | A1 * | 9/2008 | Hosaka et al. ................ 429/209 |
| 2011/0111294 | A1 | 5/2011 | Lopez et al. |
| 2013/0004847 | A1 | 1/2013 | Kumar et al. |

FOREIGN PATENT DOCUMENTS

EP         1020944 A2     7/2000

OTHER PUBLICATIONS

Slowik et al. Exciton Screening in Amorphous Mg—Bi and Mg—Sb Alloys. Physical Review Letters, vol. 29, No. 14, 1972, pp. 934-937 [online], [retrieved on May 13, 2015]. Retrieved from the Internet <URL:http://journals.aps.org/prl/abstract/10.1103/PhysRevLett.29.934>.*

* cited by examiner

*Primary Examiner* — Basia Ridley
*Assistant Examiner* — James Erwin
(74) *Attorney, Agent, or Firm* — Dinsmore & Shohl LLP

(57) ABSTRACT

An anode active material for a magnesium battery includes a Metal M which electrochemically alloys with magnesium, magnesium, and carbon that are ball milled forming an active material mixture. The mixture may be of the formula: $Mg_aM_{1-a}$ ($0 \le a < 1$)+Carbon wherein the mixture is ball milled and has a stoichiometric amount of M and Mg and carbon of from 0.1-50 weight percent of the total mixture.

8 Claims, 4 Drawing Sheets

US 9,444,094 B2

PREPARATION OF HIGH ENERGY-DENSITY ELECTRODE MATERIALS FOR RECHARGEABLE MAGNESIUM BATTERIES

FIELD OF THE INVENTION

The invention relates to anode active materials for rechargeable batteries and methods of preparing the anode active materials.

BACKGROUND OF THE INVENTION

Rechargeable batteries such as lithium ion and magnesium ion batteries have numerous commercial applications. Energy density is an important characteristic, and higher energy densities are desirable for a variety of applications.

A magnesium ion in a magnesium ion or magnesium ion battery carries two electrical charges, in contrast to the single charge of a lithium ion. Improved electrode materials would be useful in order to develop high energy density magnesium batteries.

The insertion and extraction of magnesium ions from the active material may affect the structural integrity of the active material. For example, the magnesiation reaction of Bi may result in a volume increase by 167%, which may result in cracking or structural damage of $Mg_3Bi_2$ alloys used as an active material in an anode. Such cracking of the $Mg_3Bi_2$ alloy may cause the isolation of Bi, increase the impedance and eventually decrease the capacity of the electrode. There is therefore a need in the art for an improved anode active material for a magnesium battery that has improved cycling and electrochemical performance.

SUMMARY OF THE INVENTION

In one aspect, there is disclosed an anode active material for a magnesium ion battery that includes a mixture of the formula: $Mg_aM_{1-a}(0 \le a < 1)$+Carbon wherein the mixture is ball milled and has a stoichiometric amount of NI and Mg and carbon of from 0.1-50 weight percent of the total mixture.

In another aspect, there is disclosed a magnesium ion battery having a first electrode including an active material. The battery also includes a second electrode. An electrolyte is disposed between the first electrode and the second electrode, the electrolyte including a magnesium compound. The electrolyte is in electrochemical contact with the first electrode and the second electrode. The active material includes a mixture of the formula: $Mg_aM_{1-a}(0 \le a < 1)$+Carbon wherein the mixture is ball milled and has a stoichiometric amount of M and Mg and carbon of from 0.1-50 weight percent of the total mixture.

DETAILED DESCRIPTION OF THE PREFERRED EMBODIMENTS

In one aspect, there is disclosed an anode active material for a magnesium battery that includes a Metal M which electrochemically alloys with magnesium, magnesium, and carbon that are ball milled forming an active material mixture. The mixture may be of the formula: $Mg_aM_{1-a}(0 \le a < 1)$+Carbon wherein the mixture is ball milled and has a stoichiometric amount of M and Mg and carbon of from 0.1-50 weight percent of the total mixture.

In one aspect, the metal M may be selected from metals including bismuth (Bi), tin (Sn), indium (In), antimony (Sb) and combinations thereof or other metals that alloy with magnesium. In one aspect, the carbon material may be selected from carbon black, graphite or other carbon based materials.

In one aspect, the addition of carbon may buffer a volume expansion of an active material during the charge and discharge process of a battery. The introduction of carbon may also prevent agglomeration of the metal and magnesium of the active material and prevent migration of the metal out of the active material. In one aspect, the ratio of the materials for the ball milling process is stoichiometric M and Mg and carbon of from 0.1-50% weight of the total mixture. The ball milling process may include a ball to material ratio of 1:1 to 40:1. The milling time may vary from 30 min to 100 h.

The ball milling process may produce nano-sized electrode materials. The materials may include particles having a size of less than 100 nanometers. The balling milling process may form an intermetallic compound or alloy from a solid solution reaction of the metal and magnesium.

EXAMPLES $Mg_3Bi_2$ alloy samples were mechanically prepared using a SPEX 8000M high-energy ball milling machine. In an Argon glove box, 2.4 g Bi, 0.4187 g Mg 0.72 g carbon black (dried at 150° C. under vacuum overnight prior to using) and four half inch and twenty quarter inch hardened stainless steel balls were sealed into 65 ml hardened steel vial. The mechanical milling was performed for a total of 2 hours.

After ball milling, the vial was opened in the glove box and the product was sieved with 150 mesh screen. The phase of the sample was identified by X-ray diffraction (XRD) (Rigaku) using Cu-Ka radiation. To prevent side reactions between the alloy and $O_2$ or moisture, a Kapton film was used to seal the sample during XRD measurement. The alloy electrode including the active material having the $Mg_3Bi_2$ alloy was fabricated by mixing 80 wt % active material, 10 wt % carbon black and 10 wt % poly(tetrafluoroethylene) that was pressed onto a stainless steel mesh. The electrodes were tested in three-electrode cells using Pt foil as a counter and Ag/Ag+electrode as reference electrodes. The electrolyte utilized for testing was 1M $Mg(N(SO_2CF_3)_2)_2$ in acetonitrile solution. The testing procedures were performed in an Argon glove box.

Figure 1:
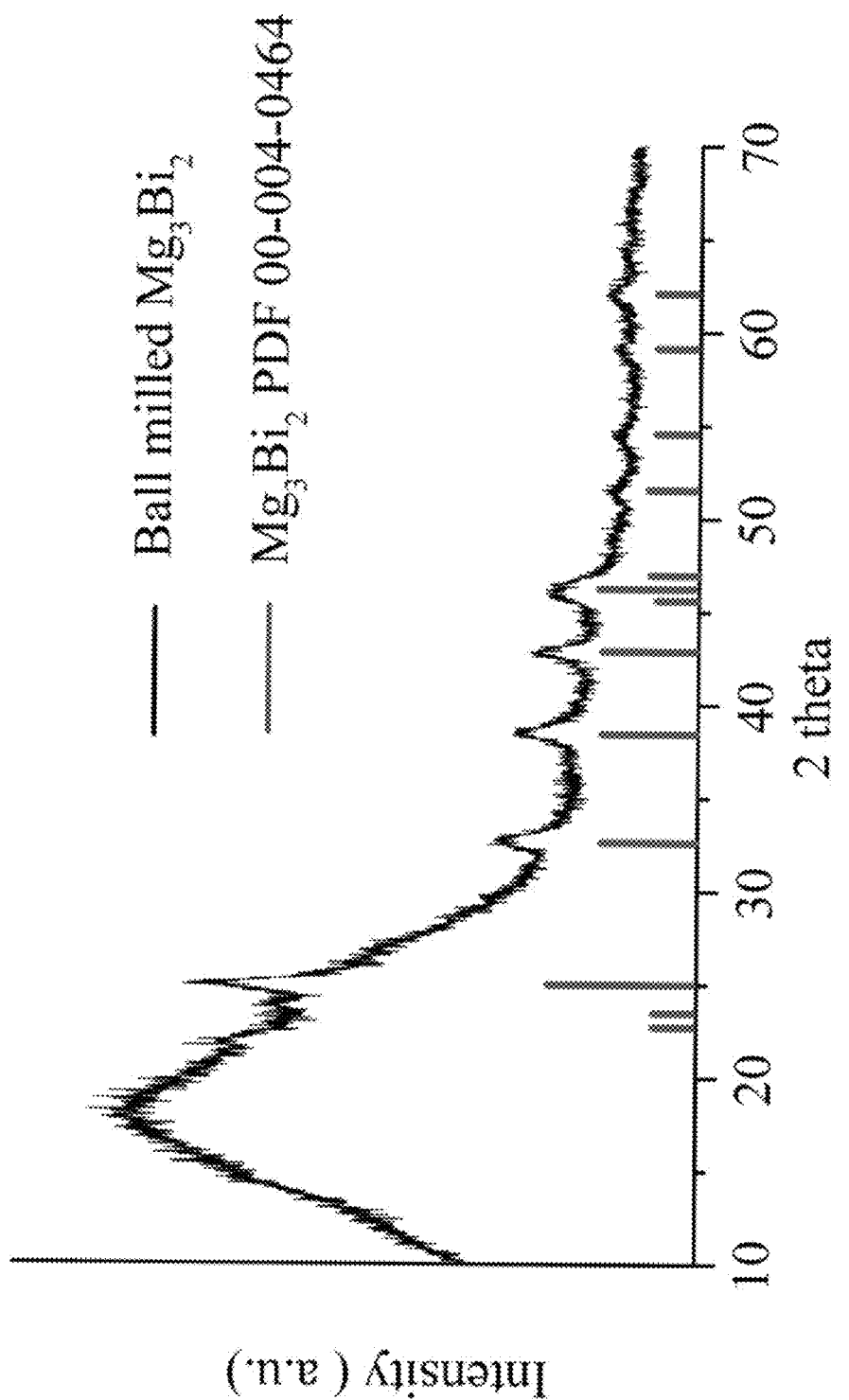
FIG. 1 is an XRD scan of $Mg_2Bi_3$ prepared by a ball milling process.

Referring to FIG. 1 there is shown the XRD patterns of the synthesized materials which correspond to a well-defined $Mg_3Bi_2$ in the trigonal phase (p3-m space group). The hump from 2 theta 10 to 30 corresponds to the diffraction of the protective Kapton film described above. The broad $Mg_3Bi_2$ peaks indicate that the alloy has a low crystallinity and/or very small grain size. There is no visible diffraction peak from the carbon material due to the amorphous structure of carbon black. Additionally, there are no visible peaks observed that correspond to magnesium/carbon and bismuth/carbon compositions.

Figure 2:
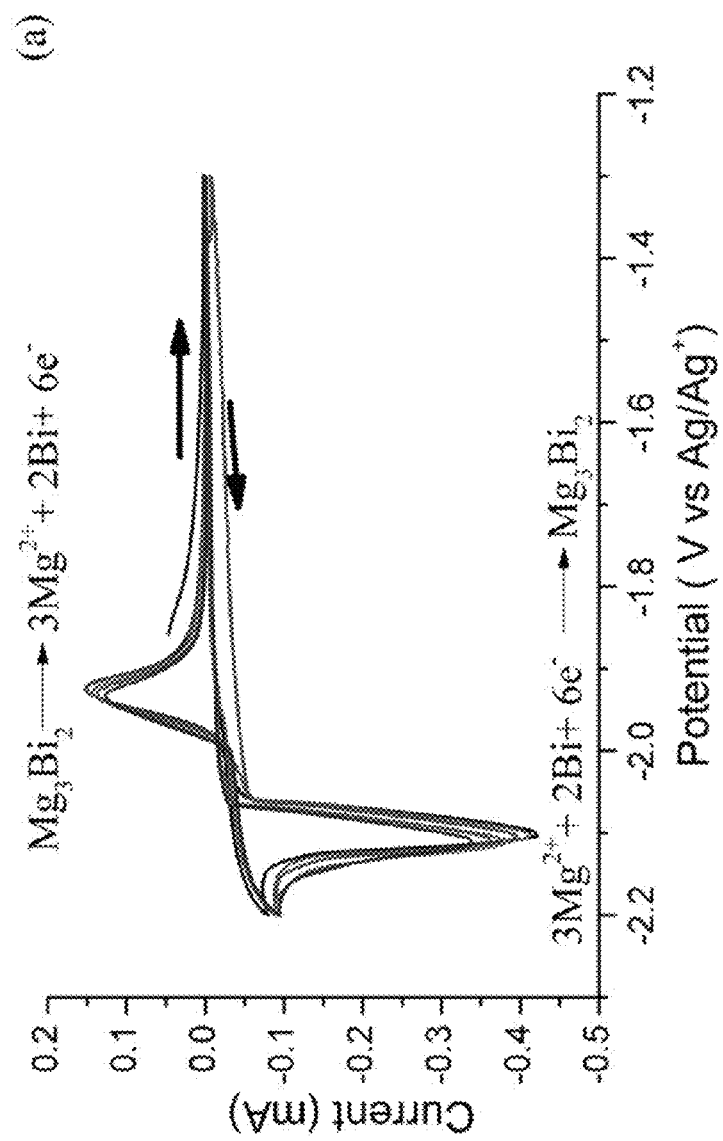
FIG. 2a is cyclic voltammogram illustrating characteristics of an electrochemical cell incorporating an anode with a $Mg_2Bi_3$ active material prepared by a ball milling process.
FIG. 2b is a comparative cyclic voltammogram illustrating characteristics of an electrochemical cell incorporating an anode with a $Mg_2Bi_3$ active material prepared by an electrochemical doping process.
Figure 2:
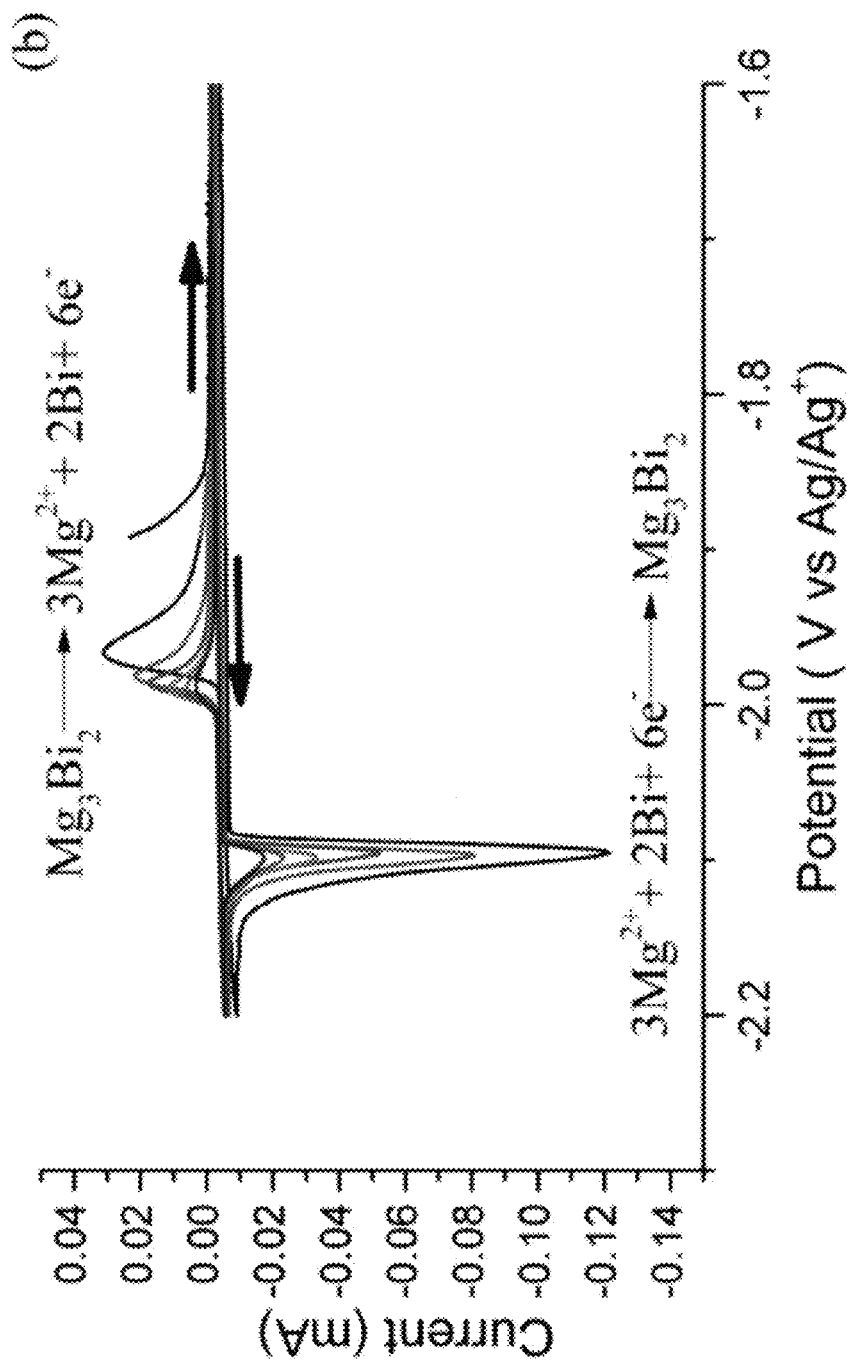

Referring to FIG. 2a, there is shown the cyclic voltammograms (CV) of the three-electrode cell between −2.2 and −1.3 V vs. Ag/Ag$^+$ at a scan rate of 0.01 mV/s. As a reference example, the CV plots of Mg$_3$Bi$_2$ synthesized utilizing an electrochemical doping method is displayed in FIG. 2b. As can be seen in FIGS. 2a and 2b, there are similar reduction peaks at −2.11 V (vs. Ag/Ag$^+$ and oxidation peaks at −1.91V (vs. Ag/Ag$^+$) for both the sample prepared by the ball milling process and the sample prepared by the electrochemical doping process.

Figure 3:
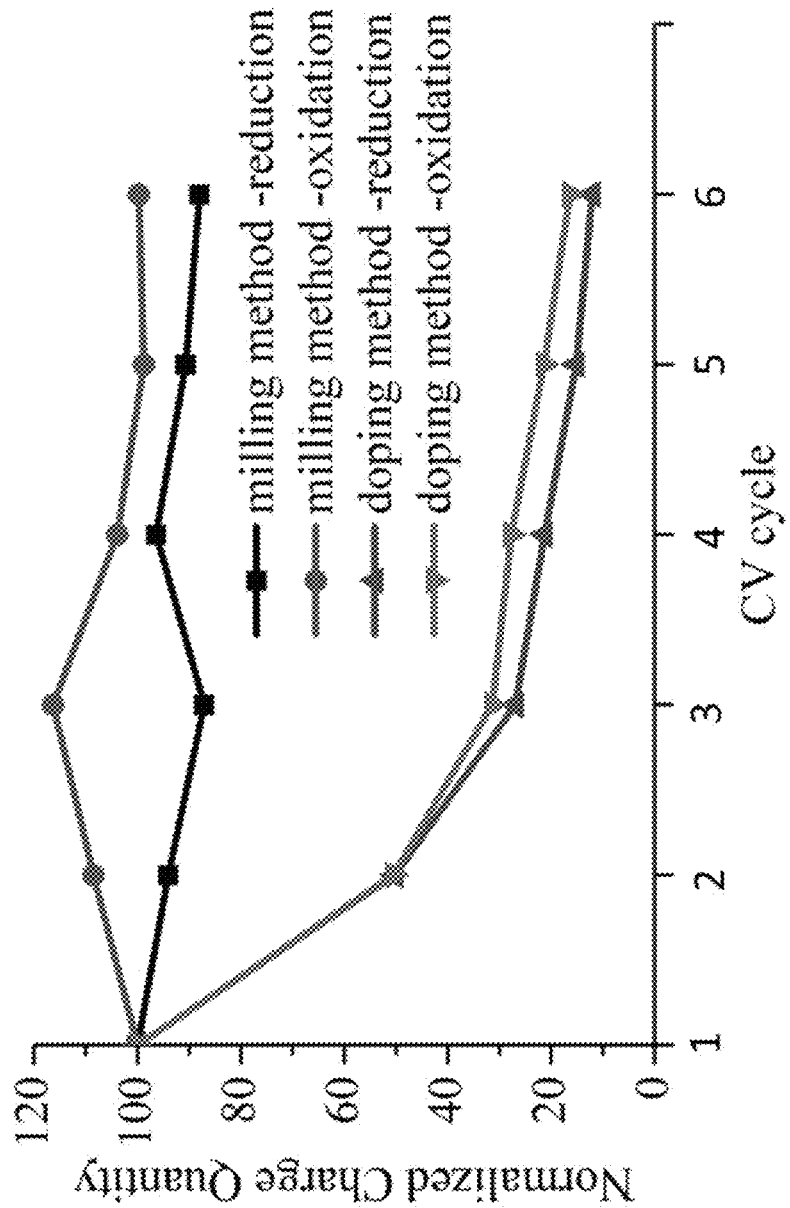
FIG. 3 is a plot of the normalized charge quantity versus the cycle number for the materials of FIGS. 2a and 2b.

Referring to FIG. 3, there is shown the normalized reduction/oxidation peaks area vs. CV cycle for the samples prepared by ball milling and the comparative example of the sample prepared by the electrochemical doping method. The peak area was calculated by printing each CV cycle on a paper cutting down the reduction or oxidation peaks and then weighting the mass of each peak. The area of the 2nd cycle of each series peak shown in FIG. 3 was normalized as 100%. As shown in the Figure, the peak area of the Mg$_3$Bi$_2$ sample prepared by ball milling has a much better stability than that of sample prepared by electrochemical doping. This stability indicates that the ball milled Mg$_3$Bi$_2$ sample will have better cycling performance when utilized as an active material in a battery system.

The improved cycling performance of the ball milling prepared Mg$_3$Bi$_2$ sample may be related with its small particle size as indicated in the XRD patterns. The addition of carbon may buffer the volume expansion of the active material as well as prevent the active material particles from aggregating to improve the electrochemical performance and cycling performance of the anode active materials. Additionally, carbon can increase the conductivity of the anode material.

The invention claimed is:

1. An anode active material for a magnesium ion battery comprising:
   a mixture of the formula: Mg$_a$M$_{1-a}$ (0<a<1)+Carbon wherein the mixture is ball milled and has a carbon content of from 0.1-50 weight percent of the total mixture wherein carbon buffers a volume expansion of the anode active material during a charge and discharge cycle and M is selected from the group of bismuth (Bi), tin (Sn), antimony (Sb) and combinations thereof wherein magnesium ions are inserted and extracted from the anode and wherein the carbon prevents agglomeration of the metal and magnesium and migration of the metal out of the active material.

2. The anode active material of claim 1 wherein the mixture includes an intermetallic compound or alloy from a solid solution reaction of the metal (M) and magnesium.

3. The anode active material of claim 1 wherein Carbon is selected from carbon black, and graphite or other carbon based materials.

4. A magnesium ion battery comprising:
   a first electrode comprising an active material;
   a second electrode;
   an electrolyte disposed between the first electrode and the second electrode, the electrolyte including a magnesium compound, and said electrolyte in electrochemical contact with said first electrode and said second electrode;
   said active material including a mixture of the formula: Mg$_a$M$_{1-a}$ (0<a<1)+Carbon wherein the mixture is ball milled and has a carbon content of from 0.1-50 weight percent of the total mixture wherein carbon buffers a volume expansion of the anode active material during a charge and discharge cycle and M is selected from of group of bismuth (Bi), tin (Sn), antimony (Sb) and combinations thereof wherein magnesium ions are inserted and extracted from the anode and wherein the carbon prevents agglomeration of the metal and magnesium and migration of the metal out of the active material.

5. The magnesium ion battery of claim 4 wherein the mixture includes an intermetallic compound or alloy from a solid solution reaction of the metal (M) and magnesium.

6. The magnesium ion battery of claim 4 wherein Carbon is selected from carbon black, and graphite or other carbon based materials.

7. The magnesium ion battery of claim 4 wherein the first electrode includes bismuth.

8. The magnesium ion battery of claim 4 wherein the active material comprises Mg$_3$Bi$_2$.

* * * * *

UNITED STATES PATENT AND TRADEMARK OFFICE
CERTIFICATE OF CORRECTION

PATENT NO. : 9,444,094 B2
APPLICATION NO. : 13/870765
DATED : September 13, 2016
INVENTOR(S) : Ruigang Zhang et al.

It is certified that error appears in the above-identified patent and that said Letters Patent is hereby corrected as shown below:

In the Specification

In Column 4, Line 26, after "discharge cycle and M is selected from", delete "of" and insert --the--, therefor.

Signed and Sealed this
Twenty-first Day of February, 2017

Michelle K. Lee
*Director of the United States Patent and Trademark Office*